(12) United States Patent
Blair et al.

(10) Patent No.: US 6,182,227 B1
(45) Date of Patent: Jan. 30, 2001

(54) LIGHTWEIGHT AUTHENTICATION SYSTEM AND METHOD FOR VALIDATING A SERVER ACCESS REQUEST

(75) Inventors: Steven Cameron Blair, Austin; Sebastian Hassinger, Blanco; William W. Hurley, II, Round Rock; William Meyer Smith, Austin, all of TX (US); John J. E. Turek, South Nyack, NY (US)

(73) Assignee: International Business Machines Corporation, Armonk, NY (US)

(*) Notice: Under 35 U.S.C. 154(b), the term of this patent shall be extended for 0 days.

(21) Appl. No.: 09/102,422

(22) Filed: Jun. 22, 1998

(51) Int. Cl.$^7$ ........................... G06F 13/00
(52) U.S. Cl. ................................. 713/201; 380/23
(58) Field of Search .................... 713/201, 200, 713/202; 380/4, 21, 23, 25, 49; 714/18, 20, 39; 709/224, 225; 340/825.34, 825.31

(56) References Cited

U.S. PATENT DOCUMENTS

| | | | |
|---|---|---|---|
| 5,414,833 | 5/1995 | Hersheey et al. | 395/575 |
| 5,450,593 | * 9/1995 | Howell et al. | 395/650 |
| 5,542,046 | 7/1996 | Carlson et al. | 395/186 |
| 5,550,984 | 8/1996 | Gelb | 395/200.17 |
| 5,611,048 | * 3/1997 | Jacobs et al. | 395/200.09 |
| 5,623,601 | 4/1997 | Vu | 395/187.01 |
| 5,684,951 | 11/1997 | Goldman et al. | 395/188.01 |
| 5,692,124 | 11/1997 | Holden et al. | 395/187.01 |
| 5,696,965 | * 12/1997 | Dedrick | 395/610 |
| 5,719,938 | * 2/1998 | Haas et al. | 380/21 |
| 5,909,493 | * 6/1999 | Motoyama | 380/25 |
| 5,960,170 | * 9/1999 | Chen et al. | 395/183.14 |
| 5,983,348 | * 11/1999 | Ji | 713/200 |
| 6,029,196 | * 2/2000 | Lenz | 709/221 |

FOREIGN PATENT DOCUMENTS

| | | |
|---|---|---|
| 6110762 | 12/1991 | (JP). |
| 9634354 | 4/1996 | (WO). |

OTHER PUBLICATIONS

IBM Technical Disclosure Bulletin, "Method for Dynamically Routing Web Requests to Different Web Servers," vol. 40, No. 12 (Dec. 1997).

IBM Technical Disclosure Bulletin, "Virus Checker Integrated in Web Explorers and File Transfer protocol Utilities," vol. 39, No. 1 (Jan. 1996).

* cited by examiner

*Primary Examiner*—Nadeem Iqbal
(74) *Attorney, Agent, or Firm*—Jeffrey S. LaBaw; David H. Judson

(57) ABSTRACT

A method of validating a request to access a target server in a computer network having an open, trusted database. The method begins when a request to access the target server is received at a host from which the scheme is supported. In response, a query is initiated to the trusted database to identify a technical, administrative or other contact person that may authorize the access request. In the Internet, the trusted database may be the WHOIS database that includes second level domain name information. A second query (e.g., an e-mail) is then launched to the identified contact. The e-mail preferably includes a URL and a key. The URL identifies a response Web page interface that is accessible upon entry of the key. If the identified contact accesses the Web page interface, he or she may then authorize the access request, deny the access request, or indicate under what conditions the request may occur. The invention takes advantage of existing Internet infrastructure and methods to provide a robust lightweight authentication mechanism.

27 Claims, 3 Drawing Sheets

LIGHTWEIGHT AUTHENTICATION SYSTEM AND METHOD FOR VALIDATING A SERVER ACCESS REQUEST

BACKGROUND OF THE INVENTION

1. Technical Field

The present invention relates generally to client-server computing over the Internet and more particularly to a lightweight authentication service and method to validate a given interaction with a target server.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL.

A given collection of files located at a Web server is sometimes referred to as a Web site. Site operators often desire to monitor the quality-of-service they provide to users, for example, to address and rectify service problems. Moreover, it is also known in the art to implement Web site diagnostic services whereby a given target server is "scanned" or analyzed to evaluate some given metric. Thus, for example, it may be desired to scan a given server for security vulnerability. A security scan thus might evaluate the server's configuration and identify the various software programs (and their version numbers) supported on the platform. If the security of the server is vulnerable based on some given exposure level criteria, an appropriate report may be generated so that corrective action (e.g., upgrade to a newer software version for a given program) may be taken.

While security scans may have a valid purpose, they may also be used maliciously. A scan may be used to collect information (e.g., software versions) about the server that might later be helpful in allowing an interloper to bypass system safeguards. Thus, a scan may be used to find a deficiency in the server's security that may be later exploited in a full scale attack directed at the weakness. More likely, a given security scan may be designed to simply make the server so busy that it cannot otherwise service normal requests. Such "denial of service" attacks succeed by diminishing the server's ability to perform its required processing.

A site operator may also desire to scan its server for reasons of evaluating performance, capacity or other operations. Such a scan may identify any number or type of metric, such as broken links, HTML syntax errors, aggregate file size, number of files, response times, browser incompatibility, and the like.

Regardless of the scan's purpose, providers (whether the site operator or some third party) have a significant interest in minimizing its legal exposure for any damage or loss resulting from the scan. Thus, for example, a site operator would never knowingly allow a large scale security scan to take place during the time of day when the site is expected to receive its heaviest traffic. Were such a denial of service attack to occur, the operator might face legal liability due to attendant loss.

It would be highly desirable to provide new methods and systems that would promote the widespread use of security and performance scans while at the same time reduce the likelihood that one performing such a scan would be held legally responsible for some act or omission during its occurrence.

The present invention addresses this need.

BRIEF SUMMARY OF THE INVENTION

A primary object of this invention is to control the manner by which a given server scan may be authorized and carried out.

A particular object is to place the ability to grant access to a target server, as well as the time of any such access, in the direct control of a person who is trusted, a priori, to grant or deny such access. One such trusted person is a technical contact or administrative contact identified by the site operator itself.

Another object of the present invention is to provide such operation within the context of existing Internet infrastructure so as to provide a "lightweight" authentication server scan method and system.

Another important object of this invention is to reduce legal exposure for entities that perform scanning activities with respect to servers they do not own or control.

Yet another related object is to afford a simple method for validating the legitimacy of a security scan or other access request with respect to a target machine operating in an open computer network.

Yet another object of this invention is to provide an entity with a potential legal defense or similar protection should problems arise as a result of a security scan when the requested scan may originate from anywhere in the network and/or is not validated at the point of request.

A still further object is to provide a robust and efficient validation mechanism that protects an organization should a dispute arise with respect to whether a particular scan request was made or validly authorized.

These and other objects are provided in a lightweight authentication scheme for use, for example, to implement an Internet Web site diagnostic service. The service uses existing Internet infrastructure in a novel manner to provide a low cost, yet highly effective method for validating a server security scan or other access request. In one embodiment, the invention is a method for validating a request to scan a target server in a computer network having a trusted shared resource. The computer network may be the public Internet, in which case the trusted shared resource could be the InterNIC WHOIS database. The WHOIS database includes information identifying technical and administrative contact personnel responsible for a given second level domain server. The method is operative at a host and begins when a request to scan the target server is received at the host. In response, a first query is initiated from the host to the trusted shared resource, which may be mirrored for performance reasons, to identify a technical, administrative or other contact person that may authorize the scan request. Once the contact person is identified, a second query is initiated from the host to the contact's e-mail address. This query includes the details of the request, the URL of the host, and a key that is entered (by the contact person) to provide a formal response to the access request. The key is typically a randomly-generated password or other identifier that enables the contact person to access a Web page located on the host (identified by the URL passed in the second query).

The response Web page includes an appropriate interface to enable the contact person to grant/deny access and, if necessary or desired, provide other control information such as a schedule for permitted access or a list of others who may authorize the scan.

Therefore, because the access request is first directed to a trusted source, for example, the target server technical/administrative contact, the present invention avoids after-the-fact questions that may otherwise arise regarding whether the scan was ever authorized in the first instance. Moreover, by taking advantage of existing Internet infrastructure (e.g., the WHOIS or some other "trusted" database) and methods (e-mail) and HTTP, the present invention is simple to implement and provides a robust server scan validation mechanism.

Preferably, a transaction record is generated for each access request and its associated response. The transaction record is uniquely identified by or associated with the key transmitted with the administrative contact query from the host to the target server. Each of the host and target server machines (which may be the same machine or different machines) maintains a permissions database in which the transaction records are stored to facilitate later recovery of verified information indicating whether particular scan transactions were authorized by the contact personnel and under what conditions.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
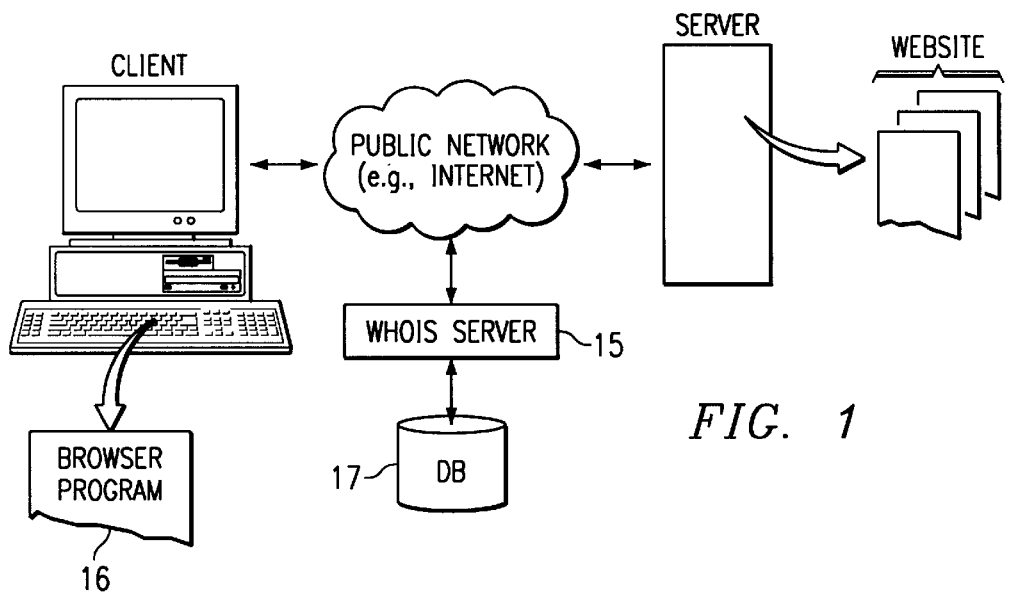
FIG. 1 is a known Internet client-server system.

By way of brief background, a known Internet-based client-server system is illustrated in FIG. 1. A client machine 10 is connected to a Web server platform 12 via network 14. For illustrative purposes, network 14 is the public Internet, an intranet or some other known network connection. Web server platform 12 is one of a plurality of servers which are accessible by clients, one of which is illustrated by machine 10. A representative client machine includes a browser 16, which is a known software tool used to access the servers of the network. The Web server platform supports files (collectively referred to as a "Web" site) in the form of hypertext documents and objects. In the Internet paradigm, a network path to a server is identified by a so-called URL or "Uniform Resource Locator" as defined in RFC 1945, which is incorporated herein by reference.

As Web server 12 is assumed to be accessible via the public network, its second level domain identifying information is registered in a trusted shared resource 15. A representative trusted resource is the InterNIC WHOIS server, which has an associated database 17. InterNIC is a cooperative activity between the National Science Foundation and Network Solutions, Inc. The InterNIC's WHOIS service provides a way of finding e-mail addresses, postal addresses and telephone numbers of those who have registered "objects" with the InterNIC. Using WHOIS, one can determine the person or persons who actually administer a particular site. In particular, WHOIS includes the online database 17 populated with information about domains, hosts, and the contacts associated with them. The names of the administrative and technical contacts for registered domains are automatically entered into the database when domain name applications are processed by the InterNIC. This information may be obtained, for example, by querying the WHOIS server 15 through a local WHOIS client, an interactive telnet session, e-mail, or the InterNIC's Web-based form.

A particular domain's administrative and/or technical contact personnel are assumed to be "trusted" by the site operator to decide whether or not and under what conditions a particular server access (e.g., a security scan) may take place. The present invention exploits this a priori trustworthiness to create a lightweight, yet robust authentication scheme as will be seen.

A representative Web client or server is a personal computer or workstation that is x86-, PowerPC®- or RISC-based, that includes an operating system such as IBM® OS/2® or Microsoft Windows NT or 95, and that further includes a browser, such as Netscape Navigator 3.0 (or higher) or Microsoft Internet Explorer 3.0 (or higher).

Figure 2:
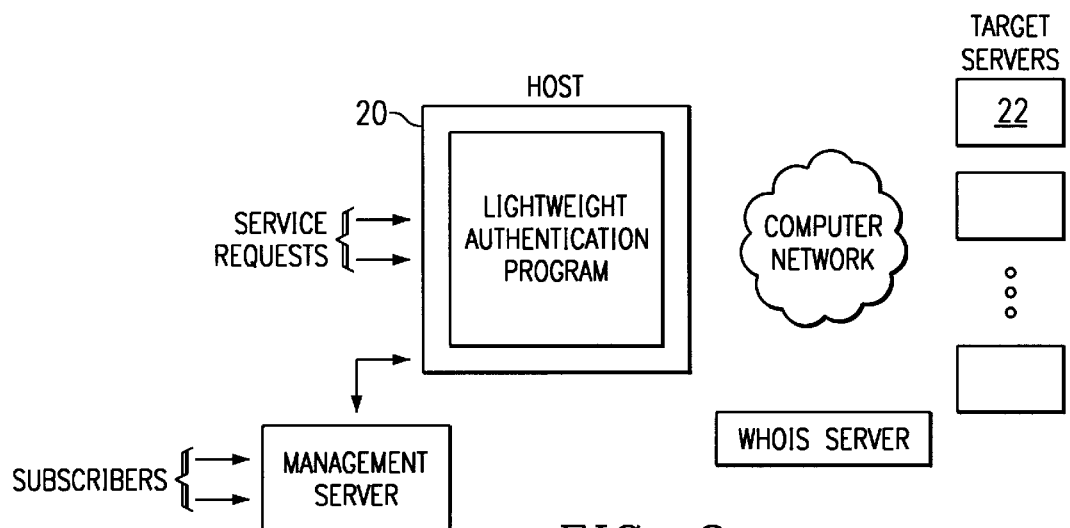
FIG. 2 is a block diagram of one preferred system architecture in which the present invention is implemented.

FIG. 2 is a representative network architecture in which the lightweight authentication system and method of the present invention is implemented. The authentication is termed "lightweight" to emphasize that, in the preferred embodiment, the scheme takes advantage of existing Internet infrastructure (e.g., WHOIS) and communication methods (e.g., e-mail). The service is preferably provided by a host computer 20 connectable to or otherwise accessible by the various machines in the network. A representative host computer is the IBM Netfinity( (any model) or PC Server( (any model) running the lightweight authentication service as an e-business application. For purpose of illustration, it is assumed that one or more servers 22 are desired to be accessed from some source (which may or may not be known ahead of time) in the network. In one illustrative example of the service, an access request may be received at the host to effect a security scan of a given target server 22. The present invention, however, is not limited to any particular purpose of the access request, as there may be many different types and reasons to access the target machine (any of which may use the authentication scheme). Thus, the access request may involve a performance analysis, an inventory request, or any other given server interaction request.

The lightweight authentication scheme is shown being illustrated as executing from the separate host computer, but this is not a requirement of the invention. The inventive process may be supported or executed from any machine in the network including the management server itself. Thus, the term "host" is used herein merely for convenience.

The service may be scaled upwards and centrally-managed by supporting the lightweight authentication system across any convenient number of host platforms and then controlling those platforms with a management server 24. Target servers (or others) may subscribe to the server diagnostic service, perhaps for a fee, so that access requests may be processed reliably and efficiently on a relatively large scale basis. The management server stores and maintains transaction records generated from access requests. It may also be used to deliver status information to a given user of the service or a given target server. Moreover, the management server enables the system to be easily-scaled and centrally-managed. In the management server implementation, the server manages the access requests and resulting transaction records on behalf of one or more customers and/or target servers, perhaps for a service fee.

Figure 3:
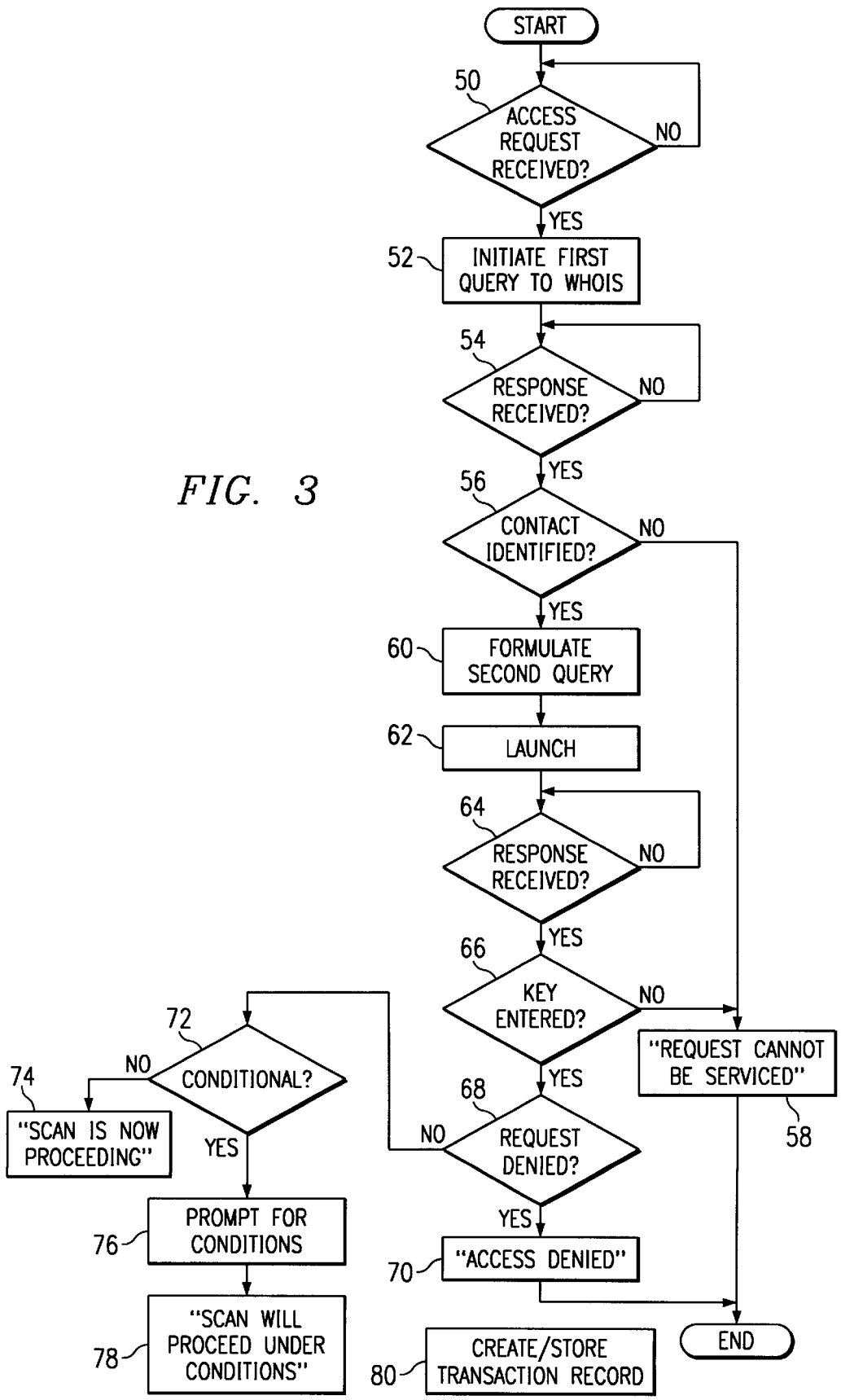
FIG. 3 is a flowchart of an illustrative method for validating a server access request according to the present invention.

The inventive authentication scheme is illustrated in the flowchart of FIG. 3. It is preferably implemented in a computer program operative in the host computer at which the scan service is provided. As noted above, the host computer may be the target computer itself. The routine begins at step 50 by testing whether a given access request (e.g., a security scan request has been received). If not, the routine cycles and waits for a request. If the outcome of the test at step 50 indicates that a request to scan a target server has been received, the routine continues at step 52 by initiating a first query. As noted above, the first query is provided to a trusted shared resource, such as the WHOIS server and its associated database, to obtain the name or other identifying information of the server's administrative or technical contact. The trusted shared resource may be a mirror site. As noted above, the first query may be effected by any number of methods: a local WHOIS client, an interactive telnet session, e-mail, or the InterNIC's Web-based form, among others. The routine then enters a control block 54 to determine whether a response has been received from the first query. If no response has been received, the routine cycles and waits for a response. A timeout may be provided if the host desires to place a time limitation on the response. When a response is received, control continues at step 56 to determine whether a contact person is identified. If not, the routine branches to step 58 and issues an indication (to the original requester) that the access request cannot be serviced.

If, however, a contact is identified in response to the WHOIS query, the routine continues at step 60 to formulate a second query. The second query includes the access request, the host URL, a randomly-generated key, and perhaps other information. At step 62, the second query is launched to the contact person identified. Typically, this query is an e-mail message provided to the contact person's e-mail address, which is usually located at the target server itself. The second query may be delivered in any other convenient manner such as via telnet, a bulletin board posting, direct communication, or the like. The routine then enters a decision block at step 64 to determine whether a given response to the second query has been received. Again, a timeout may be provided with respect to this step is desired. If the outcome of the test at step 64 indicates that a response has been received from some person purporting to be the contact person, the routine continues at step 66. At this point, a test is performed to determine whether the key has been entered to obtain access to the response Web page interface. If not, the routine returns to step 58, indicating an inability to service the request. If, however, access to the response Web page has been obtained, the routine continues.

In particular, a test is then performed at step 68 to determine whether the access request has been denied via information input on the response Web page interface. As will be seen, the interface will include appropriate control objects (menus, buttons, listboxes, and the like) with which the contact person responds to the access request. If the outcome of the test at step 68 is positive, the routine branches to step 70 to issue (to the requester) an appropriate "access denied" response message. If, however, the outcome of the test at step 68 is negative, the routine continues at step 72 (since the access request will be granted) to test whether the access request is to be conditional. If not, the routine branches to step 74 to issue (to the requester) an appropriate "access granted and scan is now proceeding" response message. If, however, the outcome of the test at step 72 is positive, the routine continues at step 76 to prompt the contact person to enter appropriate control information via the interface (or to otherwise capture such information is already entered). The routine then continues at step 78 to issue (to the requester) an appropriate "access granted and scan will proceed under the following conditions) response message. At step 80, an appropriate record is created of all information incidental to the transaction request. This completes the processing.

Thus, upon receipt of a transaction request, the routine issues a query to WHOIS to obtain the identification of an administrative and/or technical contact. That person is then queried to authorize or deny access and, if access is granted, under what conditions. Preferably, the response of the contact person is effected by having the person access a response Web page uniquely associated with the transaction as determined by the key supplied to the contact person with the actual access query. By entering the key, the contact person may access the response Web page at which the appropriate approval and conditions may be entered. Information in this page is then saved as a transaction record or log for audit and verification purposes. The authentication scheme thus makes highly efficient use of existing Internet infrastructure, resources and methods to provide a "lightweight" authentication scheme to respond to and validate server access requests. In the preferred embodiment of FIG. 2, the host is set up to provide a server diagnostic service whereby access requests are received and then serviced, possibly for a fee, in the manner described. Web sites may "subscribe" to the service.

Figure 4A:
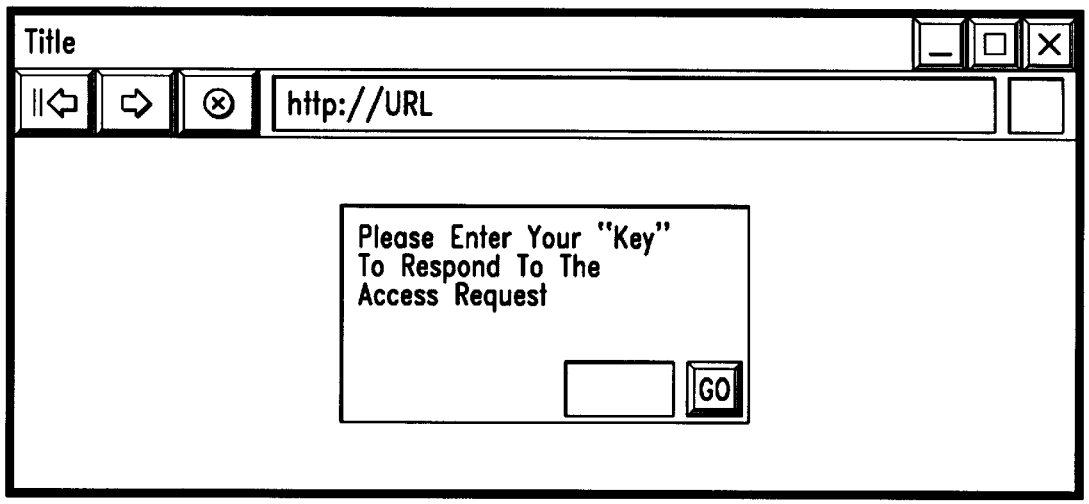
FIGS. 4A–4B represent an illustrative response Web page interface that is used by a technical or administrative contact person to enter information responsive to a given access request.
Figure 4B:
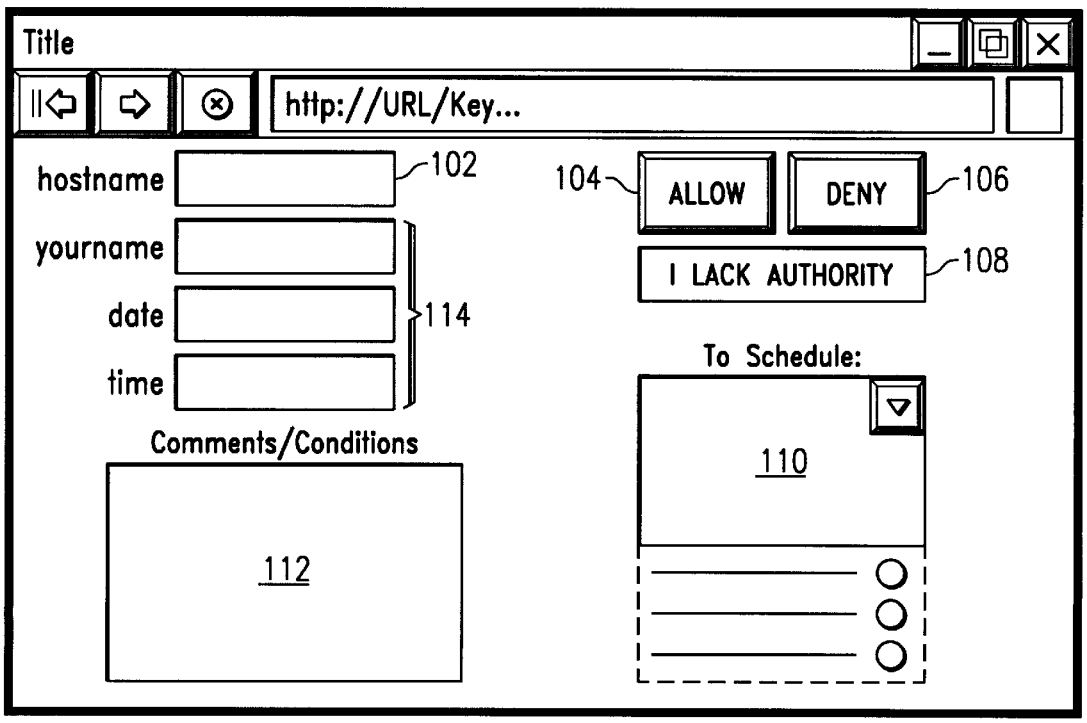

A representative response Web page interface is illustrative in FIGS. 4A–B. As seen in FIG. 4A, when the contact person enters the URL passed in the second query (e.g., in the person's Internet browser), the host Web page displays an initial dialog or gateway screen 100 requesting entry of the key. Upon entry and verification, the response Web page illustrated in FIG. 4B is displayed. This screen includes, by way of example only, a hostname field 102, an ALLOW button 104, a DENY button 106, a LACKS AUTHORITY button 108, a scheduling listbox 110 and a dialog box 112. Other identifying information (e.g., contact name, date, time, etc.) may be entered in the fields 114 as required. The hostname field 102 is used to enter the domain name. The ALLOW, DENY or LACKS AUTHORITY buttons are used to enter the access request response. The listbox 110, for example, may be used to schedule the requested access to a particular time period. The dialog box 112 is used for entry of comments or other control information (e.g., a list of persons who might authorize the request), the entry of a scheduling policy, or the like. This interface, of course, is merely illustrative as any convenient interface (including a CLI) or set of interface controls may be implemented in a known manner. The actual interface typically will depend on the type of access request in any event.

As noted above, preferably the host and/or a particular target server maintains a permissions database in which responses received from the trusted database queries are stored to facilitate later recovery of verified records indicating whether particular scan transaction were authorized by the contact personnel. Preferably, each access request and its associated response (based on information provided in the response Web page) are recorded in the form of a transaction record. This record is then stored in the host and/or the target server to form the permissions database. In one particular embodiment, each transaction record is uniquely associated with the key that was used by the contact person to access the response Web page. Stated another way, each response Web page is also uniquely associated with the key as well. Any other convenient encoding method may be used to guarantee the authenticity of the record.

It should be appreciated that a given computer that initiates the scan request to the trusted database includes a scanner for performing the scan of the target server. The scanner may be based in whole or in part in software, and it may be executed by or in conjunction with any browser running on the computer. The security scan could be performed by a client computer provided with "teaser" software or by scanning a company's server with the results reported to the requesting client (and perhaps to some authorizing entity as well).

The present invention provides numerous advantages. It provides a new validation system to solve the problem of validating the legitimacy of a security scan or other access request. It combines many complex tasks into a very simple, fluid organizational scheme that can be applied by any entity wishing to perform security scans or other potentially destructive interactions with the organization's Internet server. It provides an entity with a potential legal defense should problems arise as a result of a security scan when the requested information may originate from almost anywhere and/or is not validated at the point of request. In particular, the invention provides a robust and efficient validation mechanism that can protect the entity in the event an individual or organization dispute arises with respect to whether a particular scan request was made or validly authorized. Moreover, the invention provides a technique whereby technical or administrative contact personnel of an Internet server may halt a security scan regardless of where the request originates.

The inventive process is a method and system for authorizing and performing a security or other scan of one or more Internet servers (over the Internet) for a prospective individual user. A security scan typically comprises a point-to-point transaction in which the server performing the scan sends and receives information from the server being scanned only after the request has been approved by the server's technical and administrative contacts. According to the invention, these contacts are first identified, e.g., via an InterNIC WHOIS query lookup, and they decide whether further action may be taken with respect to the target server. Personal user information preferably is also gathered and validated during the scan request process. Once a given access request has been validated, the mechanism may also be used to schedule the server to be scanned at a time that has been determined by the server performing the scan, or provided as a preference by the individual requesting the scan, the server's technical contact, administrative contact or other trusted personnel.

As noted above, one of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, the invention may be used or practiced in any type of Internet Protocol (IP) client, not just within an HTTP-complaint client having a Web browser. Thus, as used herein, references to "browser" should be broadly construed to cover an IP client.

The present invention has been described in the context of a security scan request to the target server received from a source in the computer network. The present invention, however, provides a robust validation mechanism that is not limited merely to providing before-the-fact authorization with respect to security scan requests. Indeed, the inventive technique of querying the trusted database and then returning a response to the source may be used for any given request from the unknown source to interact with the target server. Thus, the target server may be controlled to respond to any given request for interaction received from an unknown source to effect the described method.

Having thus described our invention, what we claim as new and desire to secure by letters patent is set forth in the following claims:

1. A method of validating a request to access a target server in a computer network having a trusted shared resource, comprising the steps of:

responsive to a request to access the target server, initiating a first query to the trusted shared resource to identify a contact that is trusted to respond to the access request;

initiating a second query to the identified contact to determine whether the scan may be authorized, the second query including a key;

responsive to entry of the key by the identified contact, generating a response to the access request; and generating a transaction record of the access request and the response.

2. The method as described in claim 1 wherein the response includes an indication that the access request is authorized.

3. The method as described in claim 2 wherein the indication includes a given condition.

4. The method as described in claim 1 wherein the response includes an indication that the access request is not authorized.

5. The method as described in claim 1 wherein the response includes a list of one or more personnel who may authorize the access request.

6. The method as described in claim 1 wherein the computer network is the Internet and the trusted shared resource is a WHOIS database.

7. The method as described in claim 1 wherein the second query includes a Uniform Resource Locator (URL) identifying a host that generated the second query.

8. The method as described in claim 7 further including the step of having the identified contact associate the key with the URL prior to generating the response.

9. The method as described in claim 1 wherein the access request is a security scan.

10. The method as described in claim 1 wherein the access request is a performance scan.

11. The method as described in claim 10 wherein the key is uniquely associated with the transaction record.

12. The method as described in claim 1 further including the step of initiating the access request at the target server.

13. A method of validating a request to scan a target server in a computer network including a trusted database, comprising the steps of:

responsive to a request to scan the target server, initiating a first query to the trusted database to identify a contact that is trusted to respond to the scan request;

transmitting an e-mail to the identified contact to determine whether the scan may be authorized, the e-mail including a URL and a key; and upon access to the URL and entry of the key, issuing a response to the scan request.

14. The method as described in claim 13 wherein the response includes an indication that the target server scan request is authorized.

15. The method as described in claim 13 wherein the response includes an indication that the target server scan request is not authorized.

16. The method as described in claim 13 wherein the response includes a list of one or more personnel who may authorize the target server scan.

17. The method as described in claim 13 further including the step of generating a transaction record including information derived from the scan request and the response.

18. The method as described in claim 13 wherein the computer network is the public Internet and the trusted database is the WHOIS database.

19. The method as described in claim 13 wherein the contact is selected from a group of contact personnel consisting essentially of a technical contact, an administrative contact, and a management contact.

20. A computer program product in a computer-readable medium for use in a server connectable in a computer network having a trusted database, comprising:

means responsive to a request to scan a target server for initiating a first query to the trusted database to identify a contact that is trusted to authorize the scan;

means responsive to identification of the identified contact for initiating a second query to the identified contact to determine whether the scan may be authorized, the second query including a URL and a key; and means responsive to association of the URL to the key for displaying an interface into which the identified contact may enter a response to the scan request; and means responsive to entry of information on the interface for generating a transaction record of the scan request and the response.

21. The computer program product as described in claim 20 wherein the computer network is the Internet and the trusted database is a WHOIS database.

22. The computer program product as described in claim 20 wherein the URL identifies the server.

23. The computer program product as described in claim 20 wherein the interface includes one or more graphical display objects for receiving the information.

24. The computer program product as described in claim 20 wherein the interface is an interactive Web page.

25. A computer for hosting an authentication service in a computer network having a trusted database, comprising:

a processor having an operating system;

a browser;

means responsive to a request to scan a target server for initiating a first query to the trusted database to identify a contact that is trusted to authorize the scan;

means responsive to identification of the identified contact for initiating a second query to the identified contact to determine whether the scan may be authorized, the second query including a URL identifying the computer, and a key; and means responsive to association of the URL to the key for displaying, on the browser, an interface into which the identified contact may enter a response to the scan request; and means responsive to entry of information on the interface for generating a transaction record of the scan request and the response.

26. The computer as described in claim 25 further comprising a scanner, and means responsive to entry of the response for activating the scanner to scan the target server.

27. The computer as described in claim 26 wherein the scanner is executed by the browser.

* * * * *